(12) United States Patent
Blostein et al.

(10) Patent No.: US 10,054,366 B2
(45) Date of Patent: Aug. 21, 2018

(54) PROCESS FOR OPERATING A BLAST FURNACE INSTALLATION WITH TOP GAS RECYCLING

(75) Inventors: Philippe Blostein, Paris (FR); Michel Devaux, Roissy-en-Brie (FR); Richard Dubettier-Grenier, La Varenne Saint Hilaire (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 759 days.

(21) Appl. No.: 13/996,869

(22) PCT Filed: Dec. 20, 2011

(86) PCT No.: PCT/FR2011/053095
§ 371 (c)(1),
(2), (4) Date: Jun. 21, 2013

(87) PCT Pub. No.: WO2012/085449
PCT Pub. Date: Jun. 28, 2012

(65) Prior Publication Data
US 2013/0270752 A1    Oct. 17, 2013

(30) Foreign Application Priority Data
Dec. 21, 2010 (FR) .................. 10 60908

(51) Int. Cl.
*F27D 17/00* (2006.01)
*C21B 5/00* (2006.01)
(Continued)

(52) U.S. Cl.
CPC ......... *F27D 17/001* (2013.01); *C21B 5/006* (2013.01); *C21B 5/06* (2013.01); *C21B 7/002* (2013.01);
(Continued)

(58) Field of Classification Search
CPC ............ F27D 17/001; C21B 2100/02; C21B 2100/04; C21B 5/006; C21B 5/06;
(Continued)

(56) References Cited

U.S. PATENT DOCUMENTS 2,598,735 A * 6/1952 Webb ................. C21B 5/06
  48/197 R
5,234,490 A * 8/1993 Kundrat ............. C21B 5/06
  266/156
5,268,019 A * 12/1993 Rathbone ........... C21B 13/14
  266/155

FOREIGN PATENT DOCUMENTS

DE   2037541   * 2/1972 ........... C21B 5/06
DE   2037541 A1   2/1972
(Continued)

OTHER PUBLICATIONS

Werner, blast furnace—uses regenerated flue gas/oxygen wind, Feb. 10, 1972.*
(Continued)

*Primary Examiner* — Scott Kastler
*Assistant Examiner* — Michael Aboagye
(74) *Attorney, Agent, or Firm* — Elwood L. Haynes

(57) ABSTRACT

Blast furnace installation having top gas recycling and process for operating same, in which the oxygen concentration of the oxidizing gas injected into the blast furnace is regulated as a function of the flow rate of the recycled top gas.

14 Claims, 1 Drawing Sheet

(51) Int. Cl.
*C21B 5/06* (2006.01)
*C21B 7/00* (2006.01)

(52) U.S. Cl.
CPC ...... *C21B 2100/26* (2017.05); *C21B 2100/28* (2017.05); *C21B 2100/282* (2017.05); *C21B 2100/64* (2017.05); *Y02P 10/122* (2015.11); *Y02P 10/126* (2015.11); *Y02P 10/128* (2015.11); *Y02P 10/132* (2015.11); *Y02P 10/212* (2015.11); *Y02P 10/265* (2015.11); *Y02P 10/286* (2015.11)

(58) Field of Classification Search
CPC ...... C21B 7/002; Y02P 10/122; Y02P 10/126; Y02P 10/128; Y02P 10/132; Y02P 10/212; Y02P 10/265; Y02P 10/286
USPC .... 266/44, 144, 155, 156, 197, 160; 75/433, 75/466; 60/39.12
See application file for complete search history.

(56) References Cited

FOREIGN PATENT DOCUMENTS

| | | | |
|---|---|---|---|
| EP | 0189385 A2 | 7/1986 | |
| EP | 0793071 * | 9/1997 | ............... C21B 5/06 |
| EP | 0793071 A2 | 9/1997 | |
| GB | 2437958 A | 11/2007 | |
| WO | 2005085727 A2 | 9/2005 | |
| WO | 2007099246 A2 | 9/2007 | |

OTHER PUBLICATIONS

FR 1060908, French Search Report and Written Opinion, dated Aug. 9, 2011.
PCT/FR2011/053095, International Search Report, dated Feb. 17, 2012.

\* cited by examiner

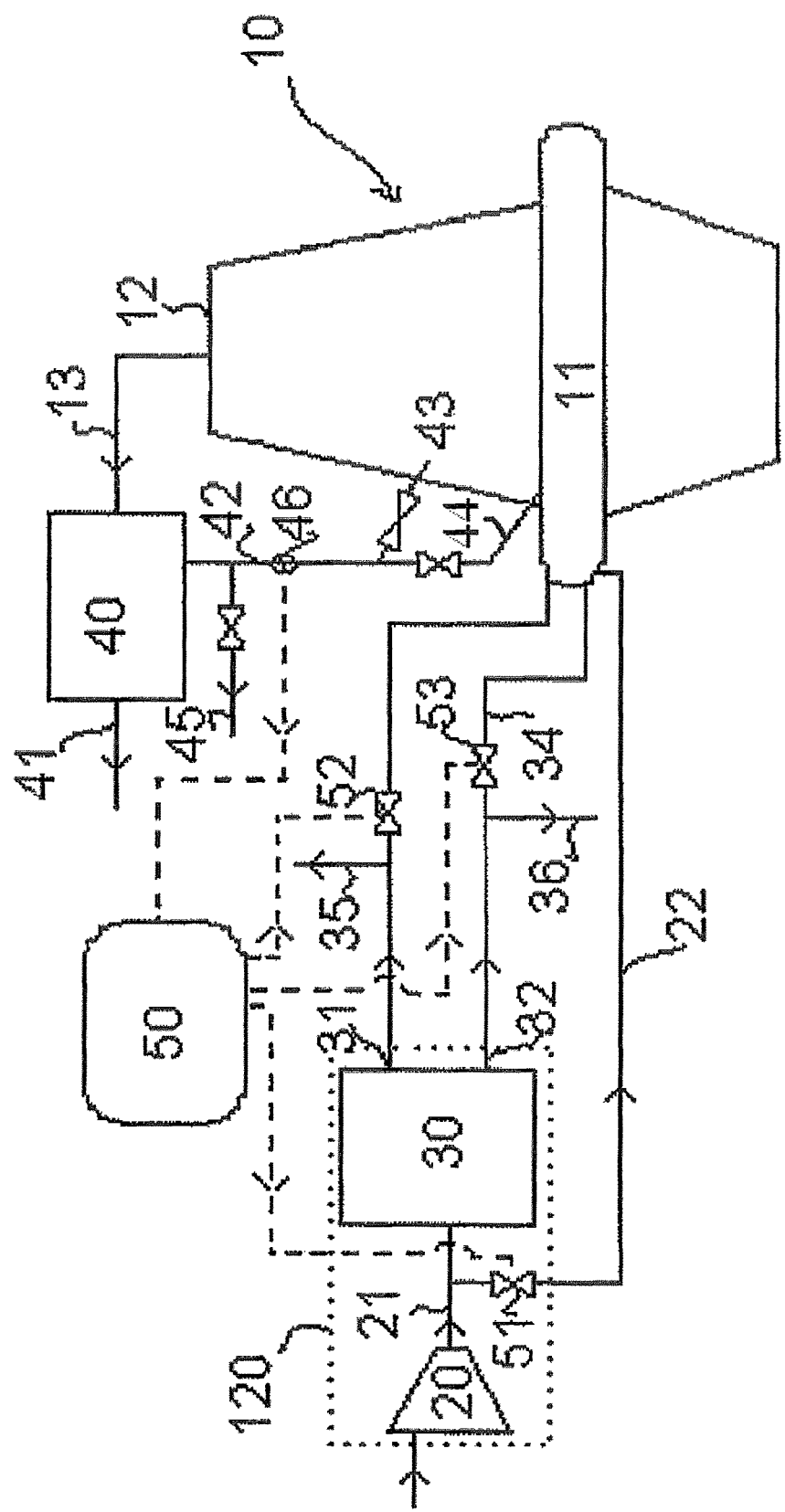

PROCESS FOR OPERATING A BLAST FURNACE INSTALLATION WITH TOP GAS RECYCLING

CROSS-REFERENCE TO RELATED APPLICATIONS

This application is a § 371 of International PCT Application PCT/FR2011/053095, filed Jun. 28, 2012, which claims § 119(a) foreign priority to French patent application 1060908, filed Dec. 21, 2010.

FIELD OF THE INVENTION

The present invention relates to the operation of blast furnace plants and in particular to the operation of such plants comprising a blast furnace of top gas recovery type.

BACKGROUND

It is known, in particular from the international patent applications WO-A-2007/099246 and WO-A-2005/085727, to enrich the air of the blast of a blast furnace with oxygen using oxygen generated by a unit for the separation of the air gases (Air Separation Unit or ASU).

It is also known to use a top gas recovery blast furnace, hereinafter denoted by the abbreviation TGRBF.

The TGRBF makes it possible to reduce the consumption of coke in the blast furnace. This technology is also one of the favored solutions envisaged by the iron and steel industry to reduce the $CO_2$ emissions of blast furnaces by capture and/or value enhancement and/or sequestration of $CO_2$ generated by blast furnaces.

In the literature, the following designations are found for this type of blast furnace:
top gas recovery blast furnace or TGRBF,
ULCOS (Ultra Low CO2 Steelmaking) blast furnace,
oxygen blast furnace, and
nitrogen-free blast furnace.

The principle on which a TGRBF is based is that of separating the top gases resulting from the blast furnace into at least a fraction enriched in $CO_2$ and a fraction enriched in CO. The fraction enriched in $CO_2$ is captured and sequestered, used on site or, preferably, enhanced in value. The fraction enriched in CO is re-injected into the TGRBF.

For efficient operation of a TGRBF, the top gases generated by the blast furnace have to consist predominantly of carbon oxides (CO and $CO_2$). To this end, instead of air, a gas richer in oxygen is used for the blast injected into the TGRBF.

A specific example of such a known TGRBF is described in DE-A-2037541. According to this process, a portion of the recovered top gas is injected mid-stack as a reducing gas. A second portion of the recovered top gas is mixed with oxygen and this mixture is injected as blast into the lower part or base of the blast furnace. In order to achieve temperatures analogous to those achieved with a blast consisting of air, it is proposed to use a mixture of recovered top gas and oxygen having an oxygen content identical to that of air. It is also possible to envisage using mixtures exhibiting other oxygen contents, given the reduced consumption of coke in the TGRBF and the corresponding reduction in the need for blast for the combustion of the coke in the base of the blast furnace.

It is possible in particular to provide an air separation unit located close to the TGRBF. Such an air separation unit receives compressed air, supplied by an air compressor or a blower, and separates this compressed air into at least an oxygen-rich gas and a nitrogen-rich gas. The oxygen-rich air gas is then used as blast in the TGRBF.

In the present context "oxygen-rich" gas is understood to mean a gas having an oxygen content greater than the oxygen content of air (that is to say, greater than 21.0 vol % $O_2$ and up to 100.0 vol % $O_2$) and a "nitrogen-rich" gas is understood to mean a gas having a nitrogen content greater than the nitrogen content of air (that is to say, greater than 78.1 vol % $N_2$ and up to 100.0 vol % $N_2$).

At least (a) a blast comprising oxygen-rich gas supplied by the air separation unit and (b) top gas enriched in recovered $CO_2$ are thus continuously injected into the TGRBF.

The arrangement necessary for the operation of conventional blast furnace plants comprises the blast furnace as such, one or more air blowers for the blast, chimneys, and the like, and requires major capital costs.

A top gas recovery blast furnace plant furthermore requires an air separation unit in order to supply an oxygen-rich gas and a plant for the treatment of top gas and for the recovery of the fraction enriched in CO and, preferably, also a plant for the conditioning of the fraction enriched in $CO_2$.

What is more, given that the TGRBF top gas is generated by the TGRBF itself, the operator of the TGRBF does not have available, at the beginning of a cold start-up of the TGRBF, a (sufficient) stream of top gas enriched in CO to be recovered and injected into the blast furnace.

Consequently, the operator of the TGRBF has to take into account the absence of this reducing gas at the time of the cold start-up of the TGRBF.

Thus, the operator can provide an initial interim stage before the continuous operation of the TGRBF during which a blast poorer in oxygen is injected into the TGRBF, which blast consists of compressed air, indeed even of compressed air enriched in oxygen. Said compressed air for the start-up of the blast furnace is provided by an additional compressor or blower, which requires a not insignificant additional capital cost.

SUMMARY OF THE INVENTION

The aim of the present invention is in particular to limit the capital costs necessary by making possible an operation of the metallurgical plant outside the continuous operation of the TGRBF, in particular a cold start-up, by means essentially of the equipment necessary for the continuous operation of the TGRBF.

BRIEF DESCRIPTION OF THE FIGURES

The FIGURE is a diagrammatic representation of an example of a blast furnace plant in accordance with one embodiment of the present invention.

DETAILED DESCRIPTION OF THE INVENTION

The present invention relates in particular to a process for the operation of an iron and steel plant comprising a TGRBF. According to this process, the blast furnace plant comprises an air plant, a blast furnace and a unit for the treatment of the top gases, referred to hereinafter as "gas treatment plant". The air plant comprises a compression unit and a unit for the separation of the air gases, hereinafter referred to as "air separation unit".

According to this process, the compression unit generates compressed air and the air separation unit (a) receives compressed air generated by the compression unit and (b) divides the compressed air received into at least an oxygen-rich air gas and a nitrogen-rich air gas.

A blast is injected into the blast furnace. This blast comprises an oxidizing gas generated by the air plant. Said oxidizing gas has an oxygen concentration $Cvox \geq 21.0$ vol % (and up to 100.0 vol %) and a flow rate Dvox.

The blast furnace generates a top gas.

The gas treatment unit receives top gas generated by the blast furnace and divides this received top gas into at least a top gas enriched in $CO_2$ and a top gas enriched in CO. At least a portion of the top gas enriched in CO is recovered and injected into the blast furnace as reducing gas with a flow rate Drco. In order to reduce the emissions of $CO_2$ from the blast furnace plant, it is desirable for at least a portion, indeed even all, of the top gas enriched in $CO_2$ to be captured and/or enhanced in value and/or sequestered.

One characteristic of the invention is that the origin and the composition of the oxidizing gas of the blast can vary.

According to the invention, the oxygen concentration Cvox of the oxidizing gas varies as a function of the flow rate Drco of the recovered top gas enriched in CO, the oxidizing gas of the blast being chosen from:
(a) compressed air generated by the air compression unit,
(b) oxygen-rich air gas generated by the air separation unit,
(c) a mixture of said compressed air with said oxygen-rich air gas,
(d) a mixture of the oxygen-rich air gas with nitrogen-rich air gas generated by the air separation unit, and
(e) a mixture of said compressed air with the oxygen-rich air gas and with the nitrogen-rich air gas.

Generally, during the melting process, the concentration Cvox of the oxidizing gas is increased when the flow rate Drco of the recovered reducing top gas enriched in CO increases and the concentration Cvox of the oxidizing gas is lowered when the flow rate Drco of the recovered top gas enriched in CO falls.

The process according to the invention also makes it possible to regulate the flow rate Dvox of the oxidizing gas, in particular, as a function of the flow rate Drco of the recovered top gas enriched in CO.

It should be noted that, in the context of the present invention, the compression unit generally comprises a multitude of blowers or air compressors.

Similarly, the separation unit can comprise one or more air separation plants.

According to one embodiment, the oxidizing gas constitutes at least 90 vol %, indeed even all, of the blast injected into the blast furnace.

It is obvious that, for the adjusting of the concentration Cvox and/or the flow rate Dvox of the oxidizing gas of the blast, other parameters of the melting process which impact the need for oxygen of the process will also be taken into account, such as the state of operation of the melting process, the type of cast iron to be obtained, the quality of the coke, and the like.

The oxygen concentration Cvox and/or the flow rate Dvox can thus vary as a function of the flow rate Drco of recovered top gas enriched in CO but not exclusively as a function of this flow rate Drco.

The oxygen concentration Cvox and/or the flow rate Dvox of the oxidizing gas can in particular be adjusted according to a predetermined program or can be determined in real time (for example as a function of measurements carried out).

The fact that, according to the invention, the oxidizing gas of the blast can be one of the gases or mixtures of gases mentioned above makes possible great variation in the concentration Cvox of the oxidizing gas and thus of the blast injected into the blast furnace.

The invention thus makes it possible to adjust and to optimize the oxygen concentration Cvox of the blast as a function of the working of the TGRBF, this being the case throughout the duration of the operation of the blast furnace, including:
during the start-up of the blast furnace, when there is no recoverable top gas enriched in CO or when this stream of recoverable top gas is lower than in continuous running of the TGRBF,
in the event of a shortage of oxygen-rich air gas due to a reduced production of the air separation unit or because of a greater need for oxygen-rich air gas by another plant on the site,
in the event of a shortage of recoverable top gas enriched in CO due to a reduced treatment capability of the gas treatment unit,
when the blast furnace is operated under non-TGRBF conditions, that is to say without recovery of top gas.

The invention thus makes it possible to adapt the oxygen concentration Cvox of the oxidizing gas of the blast as a function of the stream of recovered top gas enriched in CO.

For example, the invention makes it possible to start up the blast furnace with a blast which consists of compressed air and to control, indeed even to keep substantially constant, the content of reducing agents (such as CO and $H_2$) in the atmosphere of the blast furnace, despite the increasing flow rate Drco of recovered top gas enriched in CO (and thus reducing). This can be carried out in particular by passing from an oxidizing gas consisting of compressed air to an oxidizing gas consisting of compressed air enriched (if appropriate, gradually) in oxygen by means of oxygen-rich air gas.

In the same way, it is also possible to control the total flow rate of gas injected into the blast furnace, that is to say the flow rate of blast plus the flow rate Drco of recovered top gas enriched in CO, despite the variations in the latter by regulating the flow rate Dvox of the oxidizing gas of the blast as a function of the flow rate Drco.

Similarly, when the blast furnace starts up with a blast which consists substantially of compressed air enriched in oxygen-rich air gas, the invention makes it possible to control the content of reducing agents in the atmosphere of the furnace and/or to control the total flow rate of gas injected into the blast furnace, despite the increasing flow rate Drco of recovered top gas enriched in CO. This can be carried out in the oxidizing gas of the blast by increasing the ratio of the amount of oxygen-rich air gas to the amount of compressed air, that is to say by increasing the enriching in oxygen of the oxidizing gas and/or by varying the flow rate Dvox.

As indicated above, the invention makes it possible, similarly, to adapt the operation of the blast furnace when the flow rate Drco of the recovered top gas enriched in CO changes for other reasons.

The plant for the treatment of the top gases can in particular comprise a unit chosen from a unit or a combination of units of (V)PSA type ("Pressure Swing Adsorption" with optionally desorption under Vacuum) or of cryogenic type (also known as CPU, in which the $CO_2$ is at least partially condensed at a temperature of less than $-10°$ C.) or of chemical washing type (for example: amine unit) or of physical washing type (Selexol™ or Rectisol™ type, and the like). A particularly useful unit is described in the patent EP-B-189 385 of the Applicant Company.

The air compression unit comprises one or more air compressors or air blowers. The compression unit advantageously provides compressed air at a pressure of at least 2.5 bar abs., preferably between 4.0 bar abs. and 7.0 bar abs.

The air separation unit can consist of just one or several plants for the separation of the air gases, such as a pump unit or an external compression device based on a process of "double vaporizer", "double column" or "mixing column" type. It can be dedicated solely to the blast furnace plant. However, it can also be set up so as to provide oxygen-rich air gas and/or nitrogen-rich air gas to other plants on the site of the blast furnace plant or close to this site.

Usefully, the oxygen-rich air gas generated by the air separation unit exhibits an oxygen concentration of at least 40.0 vol % and up to 100.0 vol %, preferably of at least 90.0 vol %, indeed even 95.0 vol % and more preferably of at least 99.5 vol %.

Furthermore, the portion of nitrogen-rich air gas generated by the air separation unit advantageously exhibits a nitrogen concentration of at least 95.0 vol % and up to 100.0 vol %, preferably of at least 99.0 vol % and more preferably of at least 99.9 vol %.

It should be noted that the compressed air and/or the nitrogen-rich air gas generated by the air plant can also be used as purging gas in the iron and steel plant, for example in order to purge the gas plant or to purge the blast furnace.

When it is envisaged to enhance the value and/or to sequester the top gas enriched in $CO_2$ generated by the gas treatment plant, this top gas enriched in $CO_2$ preferably exhibits a $CO_2$ concentration of at least 50 vol % (and up to 100 vol %), preferably of at least 90 vol % and more preferably of at least 95 vol %.

Furthermore, the top gas enriched in CO, at least a portion, indeed even all, of which is normally recovered to the blast furnace, advantageously exhibits a CO concentration of at least 50 vol % (and up to 100 vol %), preferably of at least 60 vol % and more preferably of greater than at least 75 vol %. The top gas enriched in CO can advantageously also exhibit an $H_2$ concentration of greater than 4 vol %, preferably of at least 10 vol % and more preferably of at least 15 vol %, and typically of less than 45 vol %.

According to one embodiment of the invention, when the flow rate Drco of recovered top gas enriched in CO is zero, the stream of air gas consists of compressed air and the blast furnace operates in conventional mode.

This is possible in particular with a specific embodiment of the invention, according to which the oxidizing gas of the blast of the blast furnace consists of:
(a) oxygen-rich air gas, or
(b) compressed air, or
(c) a mixture of oxygen-rich air gas with compressed air.

In this case, the oxidizing gas of the blast is thus compressed air, oxygen-rich air gas or compressed air enriched with oxygen-rich air gas.

According to an alternative method of operation of the invention, when the flow rate Drco of the recovered top gas enriched in CO is zero, the oxidizing gas of the blast consists of a mixture of oxygen-rich air gas with compressed air. The oxidizing gas of the blast is then air enriched in oxygen and the blast furnace typically operates in the intermediate mode.

This can in particular be made use of with an embodiment of the invention in which the oxidizing gas of the blast consists of:
(a) oxygen-rich air gas or
(b) a mixture of oxygen-rich air gas with compressed air.

In this case, the oxidizing gas of the blast is either compressed air enriched in oxygen or oxygen-rich air gas generated by the air separation unit.

It is also possible to use, for the oxidizing gas of the blast, only gases generated by the air separation unit. In this case, the oxidizing gas of the blast will typically consist of:
(a) oxygen-rich air gas or
(b) a mixture of oxygen-rich air gas with nitrogen-rich air gas.

In this case, the oxygen concentration Cvox of the oxidizing gas of the blast is controlled by the ratio in the oxidizing gas between the nitrogen-rich air gas and the oxygen-rich air gas, the nitrogen-rich air gas (when present) being a diluent (in terms of oxygen concentrations) for the oxygen-rich air gas.

In the operation of a TGRBF, the oxygen concentration in the oxidizing gas of the blast is typically a maximum when the flow rate Drco of the recovered top gas enriched in CO reaches maximum. Thus, when the flow rate Drco of the recovered top gas enriched in CO reaches its maximum, the oxidizing gas of the blast preferably consists completely of oxygen-rich air gas.

The recovered top gas enriched in CO can be injected into the blast furnace at different levels. It is thus possible to inject at least a portion of the recovered top gas enriched in CO into the blast furnace at mid-stack. It is also possible to inject at least a portion of the recovered top gas enriched in CO into the blast furnace substantially at the level of the injection of the blast, but separately from the blast. Different forms of injection can be combined for optimization of the process according to the invention.

The present invention also relates to a blast furnace plant suitable for the implementation of the process according to the invention.

The blast furnace plant according to the invention consequently comprises:
  an air plant comprising:
    1. an air compression unit,
    2. an air separation unit,
  a blast furnace, and
  a gas treatment plant.

The air compression unit exhibits an atmospheric air inlet and a compressed air outlet. The air separation unit exhibits a compressed air inlet connected to the compressed air outlet of the compression unit. The air separation unit also exhibits an outlet for oxygen-rich air gas and an outlet for nitrogen-rich air gas. The blast furnace comprises a top via which the top gases generated by the blast furnace are discharged. The blast furnace is also equipped with tuyeres for the injection of blast into the blast furnace. The tuyeres are connected to the air plant via an air gas feed network. The gas treatment plant is connected to the top of the blast furnace. The gas treatment plant exhibits an outlet for top gas enriched in $CO_2$ and an outlet for top gas enriched in CO. The outlet for top gas rich in CO of the gas treatment plant is connected by a recovery loop to injectors for the injection into the blast furnace of a flow rate Drco of top gas enriched in CO. In the blast furnace, the top gas enriched in CO acts as reducing gas and reduces the coke requirement of the melting process. In this connection, it should be indicated that the coke represents a major cost for the melting process and the recovery of top gas enriched in CO thus makes it possible to achieve savings.

The air gas feed network, which is typically a network of interconnected gas pipes, makes it possible to connect the tuyeres of the blast furnace to one or more of the following outlets of the gas plant:

the compressed air outlet of the air compression unit,
the outlet for oxygen-rich air gas of the air separation unit, and, preferably, also the outlet for nitrogen-rich air gas of the air separation unit.

According to the invention, the blast furnace plant comprises a control unit for regulating the flow rate Dvox and the oxygen concentration Cvox of the air gas, known as oxidizing gas, supplied to the tuyeres by means of the air gas feed network. This control unit is connected to the gas treatment plant and/or to the recovery loop, so as to determine the flow rate Drco of recovered top gas enriched in CO to the blast furnace.

The control unit then adjusts the oxygen concentration Cvox of the oxidizing gas of the blast as a function of this flow rate Drco.

Preferably, the control unit also adjusts the flow rate Dvox of the oxidizing gas to the tuyeres of the blast furnace.

The adjusting of the oxygen concentration Cvox of the oxidizing gas of the blast and/or the adjusting of the flow rate Dvox of said oxidizing gas by the control unit will normally also be carried out as a function of other parameters of the process, such as the state of operation of the melting process, the type of cast iron to be obtained, the quality of the coke, and the like. To this end, the control unit can be preprogrammed by means of appropriate software.

The means for the injection of recovered top gas enriched in CO can make possible the injection of recovered top gas enriched in CO into the blast furnace at different levels, such as, in particular, the injection of recovered top gas enriched in CO at mid-stack, the injection of recovered top gas enriched in CO substantially at the level of the injection of the blast but separated from the blast, and the like, or a combination of several forms of injection.

The invention allows the TGRBF to operate in several modes:
- a "continuous operation" mode or "oxygen" mode with (a) recovery of top gas enriched in CO and (b) injection of a blast composed solely or substantially solely of oxygen-rich air gas,
- an "air operation" mode or "conventional" mode with injection of a blast composed solely or substantially solely of compressed air or composed solely or substantially solely of compressed air enriched in oxygen with oxygen-rich air gas in proportions of up to 40 vol % of oxygen in the blast,
- an intermediate mode with a blast composed solely or substantially solely of compressed air enriched with oxygen-rich air gas beyond the conventional proportion, that is to say beyond 40 vol % of oxygen in the blast, or of an analogous mixture (in oxygen content) of oxygen-rich air gas with nitrogen-rich air gas.

The conventional or intermediate mode can in particular be used in one of the following cases (nonexhaustive list):
- start-up of the blast furnace and thus lack of recoverable top gas enriched in CO,
- lack of availability of oxygen on the air separation plant,
- complete or partial failure of the gas treatment plant, resulting in a lack of availability of recoverable top gas enriched in CO,
- specific economic situation (in particular with regard to the price of coke or of the $CO_2$ emission quota) justifying a conventional or intermediate operation without treatment of top gas or with a reduced treatment and thus reduced recovery of the top gas.

By virtue of the invention, the iron and steel site exhibits a device for the production of compressed air for its blast furnace or furnaces and also its air separation unit or units which are technically and economically optimized by greater flexibility in the use of the plants present.

Thus,
- in the event of shutdown or reduced operation of one of air separation units: the air compression unit will be used to feed the blast furnace with air gas in conventional or intermediate mode,
- in the event of shutdown or reduced operation of the top gas treatment unit: the air plant will be used to generate a blast furnace blast by means of compressed air, by means of a mixture of oxygen-rich air gas with nitrogen-rich air gas, indeed even by means of a mixture of compressed air with oxygen-rich air gas and, if appropriate, also with nitrogen-rich air gas, while
- in the event of shutdown or reduced operation of the blast furnace: the compressed air generated by the air compression unit and/or the air gases generated by the air separation unit can be used for other applications on the iron and steel site or close to this site.

When the blast furnace has to be fed in conventional mode, the oxidizing gas of the blast can thus be produced:
- either directly by a compressor of the air compression unit,
- or by production of a synthetic air from oxygen-rich air gas and nitrogen-rich air gas, which are produced by the air separation unit, or
- a combination of the two.

The invention thus provides greater flexibility and greater security in the operation of a TGRBF, in return for a limited capital cost, in order to make possible the controlled regulation of the flow rate Fv and the concentration Cvox.

The FIGURE is a diagrammatic representation of an example of a blast furnace plant according to the invention. This plant comprises:
- a blast furnace 10,
- an air plant 120 comprising an air compression unit 20 and an air separation unit 30,
- a top gas treatment plant 40, and
- a control unit 50.

The air unit 120 is connected to the blast skirt 11 of the blast furnace 10 via a network of air gas feed pipes. The tuyeres for injection of the blast into the blast furnace are fitted to said skirt 11.

The air compression unit 20 (just one blower is diagrammatically represented) provides compressed air to the air separation unit 30 via the pipe 21.

The air separation unit 30 has an outlet 31 for oxygen-rich air gas and an outlet 32 for nitrogen-rich air gas 32.

The outlets 31 and 32 are connected to the skirt 11 via the pipes 33 and 34 respectively.

The skirt 11 is also connected to the outlet of the air compression unit 20 via the pipe 22.

The branch 35 of the pipe 33 makes it possible to convey a portion at least of the oxygen-rich air gas generated by the air separation unit 30 to another entity of the plant having a need for oxygen-rich air gas. The branch 36 of the pipe 34 makes it possible to similarly supply at least a portion of the nitrogen-rich air gas to another entity on or close to the iron and steel site or to the blast furnace itself (for example if the nitrogen-rich air gas is used as cooling agent for the system for charging the blast furnace).

In operation, the blast furnace 10 generates top gas, which is discharged from the blast furnace 10 via the top 12.

The discharge line 13 conveys the top gas to the gas treatment plant 40 which separates the top gas into the gas enriched in $CO_2$ and the gas enriched in CO.

The top gas enriched in $CO_2$ can be transported, via the line 41, to a capturing and sequestering plant (not illustrated).

The recovery loop 42 conveys the top gas enriched in CO to the injectors 43, 44 for the injection thereof as reducing gas into the blast furnace 10.

The branch 45 of the recovery loop 42 makes it possible to transport at least a portion of the top gas enriched in CO to other plants/units which consume CO.

In the FIGURE, just one injector 43 and just one injector 44 are shown. In practice, the blast furnace 10 is equipped with a set of injectors 43 and/or a set of injectors 44 which can be evenly distributed around the circumference of the blast furnace 10.

The injectors 43 are "mid-stack" injectors and inject top gas enriched in CO at a level above the level of injection of the blast. The injectors 44 make it possible to inject top gas enriched in CO at the same level as the blast but separately from the injection of the blast by the tuyeres.

The flow rate Drco of recovered top gas enriched in CO to the blast furnace 10 is detected by the flow meter 46 and transmitted to the preprogrammed control unit 50. The control unit 50 determines, as a function of said flow rate Drco and the other parameters of the melting process, the flow rate Dvox and the oxygen concentration Cvox of the oxidizing gas to be injected into the blast furnace for the optimized operation thereof and gives commands to the valves 51, 52 and 53 so as to produce this concentration Cvox and this flow rate Dvox by adjusting the flow rates of compressed air, of oxygen-rich air gas and of nitrogen-rich air gas sent to the blast skirt 11. Said oxidizing gas is then injected as blast into the blast furnace 10.

EXAMPLE

The TGRBF 10 represented diagrammatically in the FIGURE is designed for the production of 2 million tonnes of cast iron per year.

The volume of oxygen required for this annual production is 400 million $Nm^3$ of oxygen per year in continuous operation.

This continuous operation corresponds to the "oxygen" mode for the blast furnace, during which the blast injected into the blast furnace 10 consists of an oxygen-rich air gas (comprising 87 vol % $O_2$) supplied by the air separation unit 30 and during which top gas enriched in CO is recovered and injected into the blast furnace 10.

This air separation unit is designed so as to make possible the production of 400 million $Nm^3$ of oxygen-rich air gas and 1600 million $Nm^3$ of nitrogen-rich air gas per year.

In the event of breakdown of the unit for separation of the top gases, the plant according to the invention makes it possible, as a function of the duration of the breakdown:
either to shutdown the air separation unit 30 and to use the compressor of the air compression unit 20 for the blast requirements of the blast furnace 10,
or, in the event of a short breakdown, not to shutdown the air separation unit 30 and to manufacture a synthetic blast from the available nitrogen-rich air gas and the available oxygen-rich air gas.

Said plant according to the invention thus exhibits the major advantage of making possible optimized operation of the blast furnace at any stage of the process without major additional capital costs with regard to equipment.

In order to further optimize the use of the equipment present on the iron and steel site, the operation of the blast furnace according to the invention can in particular be combined with a process for the incorporation of an ASU in a blast furnace plant as described in WO-A-2007/099246.

Although the invention is described above in connection with the iron and steel industry, it will be apparent to a person skilled in the art that the concept of this invention can be applied to any application in which an industrial unit can operate in "conventional" or "oxygen" mode or optionally with a blast or an atmosphere which is favored (for example nitrogen) and for which it is desired to optimize the air production device in order to take these two modes into account.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the operation of a blast furnace plant, comprising: an air plant comprising, a compression unit and an air separation unit, a blast furnace, and a gas treatment plant,
the process comprising:
generating compressed air in the compression unit,
introducing the compressed air into the air separation unit thereby generating at least an oxygen-rich air gas and a nitrogen-rich air gas,
injecting a blast comprising an oxidizing gas into the blast furnace, said oxidizing gas having an oxygen concentration Cvox≥21.0 vol % and a flow rate Dvox,
generating a top gas in the blast furnace,
introducing the top gas into the gas treatment unit generating at least a top gas enriched in $CO_2$ and a top gas enriched in CO,
recovering at least a portion of the top gas enriched in CO, and injecting the top gas enriched in CO into the blast furnace as reducing gas with a flow rate Drco,
wherein the oxidizing gas is selected from the group consisting of:
(a) compressed air generated by the air compression unit,
(b) oxygen-rich air gas,
(c) a mixture of said compressed air with said oxygen-rich air gas,
(d) a mixture of said oxygen-rich air gas with the nitrogen-rich air gas, or
(e) a mixture of said compressed air with said oxygen-rich air gas and with said nitrogen-rich air gas, and
further comprising a control unit for regulating the flow rate Drco of the recovered top gas enriched in CO and the oxygen concentration Cvox of the air gas supplied to the blast furnace by means of an air gas feed network, said control unit being connected to the gas treatment plant and controlling the oxygen concentration Cvox of the air gas thus supplied as a function of the flow rate Drco of the recovered to gas enriched in CO.

2. The process of claim 1, wherein the concentration Cvox of the oxidizing gas is increased when the flow rate Drco of the recovered top gas enriched in CO increases and the concentration Cvox of the oxidizing gas is lowered when the flow rate Drco of the recovered top gas enriched in CO falls.

3. The process of claim 1, wherein the flow rate Dvox of the oxidizing gas is also regulated as a function of the flow rate Drco of the recovered top gas enriched in CO.

4. The process of claim 1, wherein the top gas enriched in $CO_2$ exhibits a $CO_2$ concentration of at least 50 vol %.

5. The process of claim 1, wherein at least a portion of the top gas enriched in $CO_2$ is captured and/or enhanced in value and/or sequestered.

6. The process of claim 1, wherein the recovered top gas enriched in CO exhibits a CO concentration between 50 vol % and 100 vol %.

7. The process of claim 1, wherein the recovered top gas enriched in CO exhibits an $H_2$ concentration of greater than 4 vol %.

8. The process of claim 1, wherein the oxidizing gas of the blast is selected from the group consisting of:
   (a) compressed air generated by the air compression unit,
   (b) oxygen-rich air gas generated by the air separation unit, and
   (c) a mixture of said compressed air with said oxygen-rich air gas.

9. The process of claim 1, wherein, when the flow rate Drco of the recovered top gas enriched in CO is zero, the oxidizing gas is compressed air.

10. The process of claim 1, wherein the oxidizing gas of the blast is selected from the group consisting of:
    (a) oxygen-rich air gas generated by the air separation unit, and
    (b) a mixture of said oxygen-rich air gas with compressed air generated by the air compression unit.

11. The process of claim 10, wherein, when the flow rate Drco of the recovered top gas enriched in CO is zero, the oxidizing gas is a mixture of said oxygen-rich air gas with compressed air.

12. The process of claim 1, wherein the oxidizing gas of the blast is selected from the group consisting of:
    (a) oxygen-rich air gas generated by the air separation unit, and
    (b) a mixture of said oxygen-rich air gas with nitrogen-rich air gas generated by the air separation unit.

13. The process of claim 12, wherein, when the flow rate Drco of the recovered top gas enriched in CO is zero, the oxidizing gas is said oxygen-rich air gas.

14. The process of claim 1, wherein, when the flow rate Drco of the recovered top gas enriched in CO reaches its maximum, the oxidizing gas is oxygen-rich air gas generated by the air separation unit.

\* \* \* \* \*